United States Patent [19]

Ruegg

[11] Patent Number: 4,615,894
[45] Date of Patent: Oct. 7, 1986

[54] C-SHELL DIE ASSEMBLY AND METHOD OF USING SAME

[75] Inventor: Richard J. Ruegg, Coppell, Tex.

[73] Assignee: Frito-Lay, Inc., Dallas, Tex.

[21] Appl. No.: 793,116

[22] Filed: Oct. 30, 1985

[51] Int. Cl.$^4$ .................. B29C 47/06; B29C 47/26; A21C 11/16
[52] U.S. Cl. .................. 426/516; 99/353; 99/450.7; 425/133.1; 425/463; 425/468; 426/502
[58] Field of Search .......... 425/133.1, 131.1, 468, 425/462, 463; 426/502, 513, 514, 516; 99/353, 450.7

[56] References Cited

U.S. PATENT DOCUMENTS

| | | | |
|---|---|---|---|
| 3,615,675 | 10/1971 | Wisdom | 99/83 |
| 3,847,531 | 11/1974 | McComb | 425/464 |
| 3,851,084 | 11/1974 | Rossen et al. | 426/343 |
| 3,857,963 | 12/1974 | Graff et al. | 426/3 |
| 3,925,563 | 12/1975 | Straughn et al. | 426/302 |
| 3,994,658 | 11/1976 | McCarthy et al. | 425/464 |
| 4,126,706 | 11/1978 | Hilton | 426/438 |
| 4,128,372 | 12/1978 | Rose et al. | 425/311 |
| 4,217,083 | 8/1980 | Machuque | 425/198 |
| 4,290,989 | 9/1981 | Topor et al. | 264/142 |
| 4,343,603 | 8/1982 | Pavlow et al. | 99/353 |
| 4,416,910 | 11/1983 | Hayashi et al. | 426/283 |
| 4,469,475 | 9/1984 | Krysiak | 99/450.6 |
| 4,481,872 | 11/1984 | Matthews et al. | 99/450.6 |
| 4,500,284 | 2/1985 | Lubke | 425/133.1 |
| 4,569,848 | 2/1986 | Giorgetti et al. | 426/514 |
| 4,574,690 | 3/1986 | Chiao et al. | 425/133.1 |

OTHER PUBLICATIONS

Ezaki Iron Words Co., Ltd., "REMARK 7001, 7002 Model".

*Primary Examiner*—Willard E. Hoag
*Attorney, Agent, or Firm*—Bernard, Rothwell & Brown

[57] ABSTRACT

A method and die assembly apparatus for extruding filled C-shaped collets over a center filling utilizes a film of air under pressure over the surface of a tube containing the center filling, the air exiting at the die face and carrying excess steam from the collet. The die assembly surrounds the filling tube and has an adjustable insert acting as a conduit for the air and separating the air from the extrudate until they are at the die face.

9 Claims, 2 Drawing Figures

C-SHELL DIE ASSEMBLY AND METHOD OF USING SAME

BACKGROUND OF THE INVENTION

1. Field of the Invention

The present invention relates to a method and die assembly apparatus for continuously extruding and filling a snack product.

2. Description of the Background Art

Continuous processes for extruding and filling snack products are known. For example, commonly owned U.S. Pat. No. 3,615,675 to Wisdom discloses forming a light puffed food product having a core filled with edible paste-like material. The product is formed by extruding a cylindrical collet around a long fill tube whose diameter increases progressively toward the tube outlet. The collet is cooled as it moves along the internal fill tube and filling is injected into the collet at the end of the tube to form a core. The collet is later cut into product pieces. The apparatus described in the Wisdom patent utilizes a filling tube having a length which is more than 50 times the tube's diameter, the physical properties of the tube and the surrounding atmosphere being used to cool the collet. A tube of such length is necessary when filling puff-extruded cylindrical collets because of the difficulty of steam escaping from a cylindrical collet. Moreover, it is extremely difficult to clean the filling tube described in the Wisdom apparatus if it becomes clogged. Since the collet produced is cylindrical, it cannot be determined by visually inspecting a continuous collet if the collet has been filled or not. Unfilled collets due to clogging of the filling tube presents the problem of waste and/or potential consumer dissatisfaction with the product.

U.S. Pat. No. 3,857,963 to Groff et al. discloses a method for forming center-filled chewing gum. During the extrusion of a hollow-centered rope of chewing gum, a center-filling is fed through an inner conduit to the hollow center of the chewing rope downstream of the extruder orifice. Air is vented from the hollow center of the rope upstream through a space between inner and outer orifice conduits.

There remains a need in the art for a method for coextruding a moisture-containing food material and a center filling material without the disadvantages of the prior art.

SUMMARY OF THE INVENTION

In accordance with the present invention, a die assembly apparatus and method for extruding filled, C-shaped collets over a center filling, utilizes a film of air under pressure over the surface of a tube containing the center filling, the air exiting at the die face and carrying excess steam from the collet. The die assembly surrounds the filling tube and has an adjustable insert acting as a conduit for the air and separating the air from the extrudate until they are at the die face.

DETAILED DESCRIPTION OF THE PREFERRED EMBODIMENT

Figure 1:
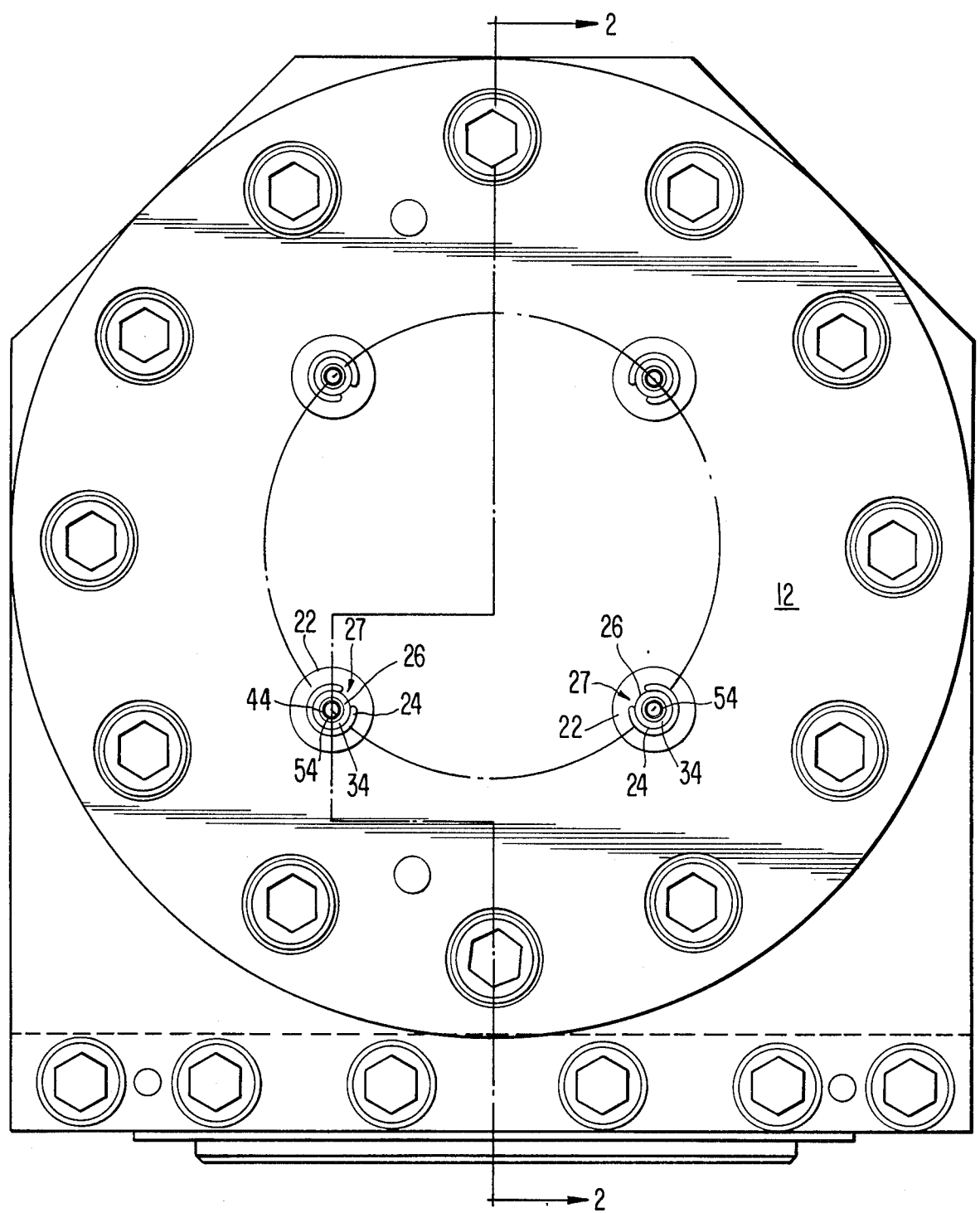
FIG. 1 is an elevation view of a die assembly according to the present invention.

The present invention relates to the continuous extrusion and filling of a generally C-shaped shell during the production of a filled snack food product. The production of puff-extruded C-shaped snack products is disclosed in commonly owned, co-pending U.S. patent application Ser. No. 618,225, filed June 7, 1984, herein incorporated by reference.

A C-shaped collet refers to any fillable extrudate in the general shape of a discontinuous circle, i.e., having a continuous longitudinal slit along the generally tubular extruded rope.

A die assembly apparatus 10 according to the present invention includes a front die member 12 and a back die member 14. See FIGS. 1 and 2. Material to be extruded enters die assembly 10 via die inlet conduit 16a from a typical cooking extruder shown schematically at 11.

Cooking extruders and puff extrusion processes are well known in the art, and generally require the use of a puff-extrudable edible material usually having a moisture content of from about 15% to about 25% by weight. The edible material is fed into a cooking extruder and heated at least to the boiling point of the liquid present in the mixture. The moisture is not allowed to escape as the mixture cooks, resulting in superatmospheric pressures developing within the extruder. When the mixture is discharged through the extruder die and exposed to reduced pressure, such as atmospheric pressure, the mixture expands 3 to 5 times as the moisture vaporizes to form a highly porous, puffed, cellular body.

Figure 2:
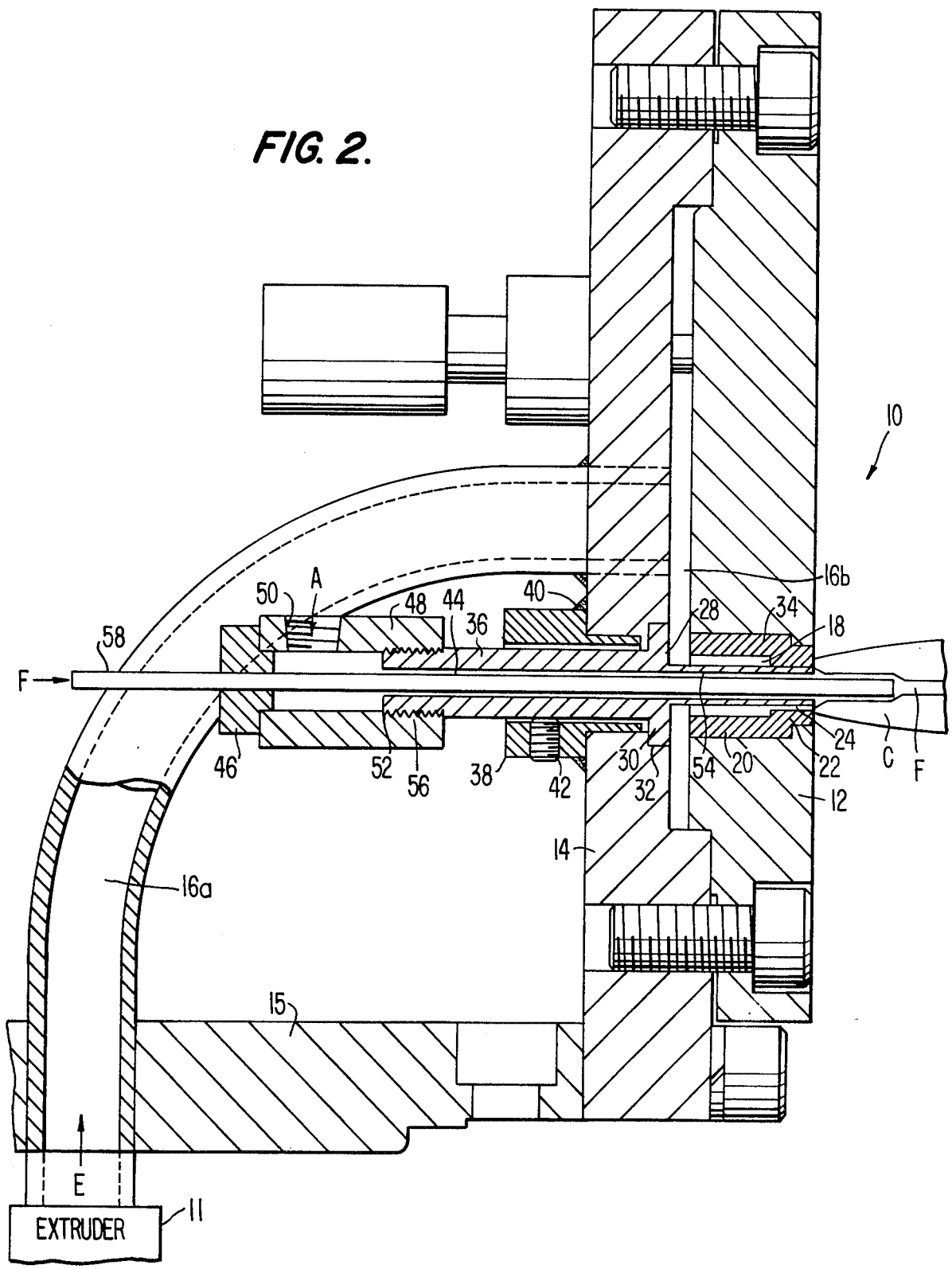
FIG. 2 is a sectional view along line 2—2 of FIG. 1 showing the die assembly according to the present invention.

Referring to FIGS. 1 and 2, edible material entering the die through die inlet conduit 16a is forced through die passageway 16b into a hollow, cylindrical die passageway 18 the outer surface of which is defined by a die insert 20 having a cylindrical wall. Conduit 16a extends through a 90° arc between an extruder interface member 15 and back die member 14. Die insert 20 includes a front die plate 22 including a C-shaped die outlet opening 24 through which the edible material is extruded and exits the die to form a C-shaped collet C. The C-shaped collet C defines a central circular area 26 which is in communication with the atmosphere through the continuous longitudinal slit 27 in the collet C, slit 27 allowing the escape of air and steam from within the collet.

A die assembly according to this invention may include a single die outlet 24 or may include a plurality of die outlets 24 as illustrated in FIGS. 1 and 2. Each of die outlets 24 are fed by a common die passageway 16b from common inlet 16a. Co-extrusion of a plurality of collets is described in commonly owned copending U.S. patent application Ser. No. 777,344, filed 9-18-85.

The back die member 14 includes a rear insert 28 having a collar portion 30 which fits within a recess 32 in back die member 14. Insert 28 also includes a front tubular portion 34 extending through die passageway 18 and front die plate 22 to become that part of the die orifice defining the inner surface of the extruded C-shaped collet C. Insert 28 further includes a rear tubular portion 36 extending rearwardly and outwardly from back die member 14.

The rear tubular portion 36 of insert 28 extends through a generally cylindrical mounting member 38 attached to back die member 14 by means of welds 40. Insert 28 is centered within the generally cylindrical mounting member 38 by means of centering screws 42 (one of which is shown in FIG. 2) extending through corresponding threaded openings in the mounting member 38 and contacting the rear tubular portion 36 of insert 28. For continuous filling of the collet C during extrusion of the collet, a removable hollow fill tube 44 is provided, insert 28 having an inner diameter slightly larger than the outer diameter of the fill tube 44.

Fill tube 44 is supported by mounting member 46 which is connected to and mounted in one end of hollow air fixture 48. The other end of air fixture 48 includes a threaded portion 52 which complementarily fits and mates with a corresponding threaded end 56 of insert 28. Air fixture 48 includes an opening 50 for a line of compressed air A (not shown).

Fill tube 44 is axially adjustably and removably mounted in air fixture 48. Mounting member 46 is preferably constructed of a resilient rubber stopper-type material which is press fitted into air fixture 48. The press fit of mounting member 46 in air fixture 48 prevents member 46 from being "blown-out" of fixture 48 when compressed air is applied through opening 50. Fill tube 44 has an end 58 which is connected to a source of filling F (not shown). The filling may be any pumpable, semi-solid material, such as nacho cheese, mexican bean, sour cream, peanut butter and the like.

Fill tube 44 extends through the fill tube support and mounting member 46 and air fixture 48, through insert 28 to the die orifice 24, extending outside of the die orifice as shown in FIG. 2. A space 54 is provided between the fill tube 44 and insert 28, through which air is forced through air fixture 48 from a source of air under pressure (not shown). Fill tube 44 preferably extends forward of the front die member 12 a sufficient distance to keep the filling from becoming overheated due to heat dissipation from the collet C and to prevent scorching or melting of the filling by steam from the collet. Fill tube 44 preferably extends outwardly from the die orifice a distance of from about 6 inches to about 40 inches. The film of air around fill tube 44 thus provides thermal insulation and an air bearing between tube 44 and collet C. Compressed air at a pressure of from about 5 p.s.i. to about 10 p.s i. provides excellent cooling of the collets without collet blowout.

If fill tube 44 becomes clogged, it can be easily removed from the die assembly by disconnecting mounting member 46 from air fixture 48 and pulling the fill tube out of the die assembly. The clogged fill tube then can be cleaned or replaced. Die assembly 10 is mounted at an angle of about 90° with respect to the face of the extruder 11 to provide easy access to back die member 14 and fill tubes 44. Also during start-up and shut-down, the fill tube can be easily removed.

In operation, extrudate E passes from the extruder through passageways 16a, 16b and 18, and is extruded through die orifice 24 and around fill tube 44 to form the C-shaped collet C. Continuously and simultaneously therewith, collet C is filled by pumping filling F through fill tube 44, and compressed air is pumped through air fixture 48 and passageway 54 to form a film of air between tube 44 and collet C. As collet C is extruded and filled, air A and steam S exit the collet through slit 27, thereby cooling the collet.

It can be seen that the present invention provides for efficient cooling of a collet while continuously extruding and filling the collet. The slit in the C-shaped collet allows the escape of steam and air, and also permits visual inspection of the collet to determine if the collet is being filled. A clogged fill tube can be easily detected and removed from the apparatus of this invention, and fill tubes can be removed during start-up and shut-down for protective reasons.

Since many modifications, variations and changes in detail may be made to the described embodiment, it is intended that all matter in the foregoing decription and shown in the accompanying drawings be interpreted as illustrative and not in a limiting sense.

What is claimed is:

1. A die assembly for coextruding a C-shaped outer shell of moisture-containing food material around a center-filling material, the assembly comprising:
    (a) a main die member assembly having a hollow configuration, a die inlet for introducing an extrudate thereto, a front die plate portion including a die outlet shaped to provide a C-shaped collet around a central circular area and means connecting the die inlet to the die outlet;
    (b) a removable fill tube for center-filling material, the tube extending axially through the die assembly and extending outwardly of the front die plate portion of the die member in the central circular area thereof, while leaving a peripheral portion of the central area open; and
    (c) means for introducing compressed air around the outside of the fill tube and the inside of the extrudate so that a film of air isolates the fill tube from the extrudate, and acts as thermal insulation and an air bearing, the air exiting the die assembly with the extrudate through said peripheral portion of the central area to carry away excess steam and cool the extrudate.

2. The die assembly as claimed in claim 1 wherein means for introducing air includes a hollow insert having an inner diameter slightly larger than the outer diameter of the fill tube, the insert positioned to surround the fill tube in the die assembly, and a source of air under pressure connected to the hollow interior of the insert.

3. The die assembly as claimed in claim 2 further comprising means for holding and centering the insert within the die member assembly.

4. The die assembly as claimed in claim 3 wherein the holding and centering means includes a mounting member attached to the die and mounting the insert, the mounting member carrying centering screws.

5. The die assembly as claimed in claim 2 wherein the filling tube is axially adjustably and removably mounted in a tube support member.

6. The die assembly as claimed in claim 5 wherein the die member assembly is a two-piece die with front and back die members, the front die member comprising a separate front die plate, and the insert being carried by the rear die member.

7. The die assembly as claimed in claim 6 wherein the filling tube has an exit end extending outwardly of the front die plate portion of the die assembly a distance of from about 6 inches to about 40 inches.

8. The die assembly as claimed in claim 1 further including an extruder interface member, the extruder interface member being at an angle of about 90° with respect to said front die plate.

9. A method of continuously extruding a C-shaped collet around a center filling, the method comprising;
    (a) continuously forcing and feeding the center filling in cylindrical form into and past an extrusion die zone;

(b) continuously and simultaneously extruding an extrudate of C-shell configuration surrounding the cylindrical center filling but spaced slightly therefrom at the extrusion die zone; and (c) continuously and simultaneously forming a film of air into the space between the center filling and the C-shaped extrudate at the extrusion die zone so that the film of air carries steam from the C-shaped collet through an opening of the collet.

* * * * *